(12) United States Patent
Kawai

(10) Patent No.: US 7,705,896 B2
(45) Date of Patent: Apr. 27, 2010

(54) IMAGING APPARATUS WHICH ADDS A FIRST NUMBER OF R AND B PIXELS, AND ADDS A SECOND NUMBER OF G PIXELS

(75) Inventor: Tomoyuki Kawai, Asaka (JP)

(73) Assignee: Fujifilm Corporation, Tokyo (JP)

( * ) Notice: Subject to any disclaimer, the term of this patent is extended or adjusted under 35 U.S.C. 154(b) by 366 days.

(21) Appl. No.: 11/730,043

(22) Filed: Mar. 29, 2007

(65) Prior Publication Data

US 2007/0242147 A1    Oct. 18, 2007

(30) Foreign Application Priority Data

Mar. 31, 2006    (JP)    ............................. 2006-100461

(51) Int. Cl.
*H04N 9/083*    (2006.01)
*H04N 3/14*    (2006.01)
*H04N 9/04*    (2006.01)
*H04N 5/335*    (2006.01)

(52) U.S. Cl. ........................................ 348/280; 348/311
(58) Field of Classification Search .............. 348/220.1, 348/273, 280, 272, 275, 311
See application file for complete search history.

(56) References Cited

U.S. PATENT DOCUMENTS

| | | | |
|---|---|---|---|
| 6,360,059 B1 * | 3/2002 | Ide et al. ..................... 396/114 |
| 6,423,959 B1 * | 7/2002 | Ikeda et al. .............. 250/208.1 |
| 6,529,236 B1 * | 3/2003 | Watanabe ................ 348/230.1 |
| 6,661,451 B1 * | 12/2003 | Kijima et al. ............ 348/220.1 |
| 6,686,960 B2 * | 2/2004 | Iizuka ......................... 348/273 |
| 6,707,494 B1 * | 3/2004 | Misawa et al. .............. 348/273 |
| 6,992,714 B1 * | 1/2006 | Hashimoto et al. .......... 348/273 |
| 7,061,655 B2 * | 6/2006 | Suzuki ........................ 358/513 |
| 7,079,184 B2 * | 7/2006 | Yanai .......................... 348/319 |
| 7,333,139 B2 * | 2/2008 | Okamoto ................. 348/230.1 |
| 7,365,794 B2 * | 4/2008 | Yasui ........................... 348/374 |
| 7,372,488 B2 * | 5/2008 | Kubo .......................... 348/266 |
| 7,372,494 B2 * | 5/2008 | Oda et al. .................... 348/311 |
| 7,443,447 B2 * | 10/2008 | Shirakawa ................. 348/376 |
| 2003/0169355 A1 | 9/2003 | Kubo |
| 2005/0280726 A1 * | 12/2005 | Parks et al. ................ 348/282 |
| 2006/0066739 A1 * | 3/2006 | Kobayashi ................ 348/294 |
| 2006/0092304 A1 * | 5/2006 | Hirota ......................... 348/311 |
| 2006/0146164 A1 * | 7/2006 | Mori et al. .................. 348/311 |
| 2007/0070204 A1 * | 3/2007 | Mentzer ................. 348/207.99 |

FOREIGN PATENT DOCUMENTS

EP    1063844 A1 * 12/2000
JP    2003-264844 A    9/2003

* cited by examiner

*Primary Examiner*—John M Villecco
(74) *Attorney, Agent, or Firm*—Birch, Stewart, Kolasch & Birch, LLP

(57) ABSTRACT

An imaging apparatus for accurate focusing detection and/or exposure control in a low-light environment with a driving control device which controls the read-out of the pixels so that the R and B pixels are each vertically added for a first number of vertical addition pixels and the G signals are vertically added for a second number of vertical addition pixels that is larger than the first number of vertical addition pixels.

14 Claims, 15 Drawing Sheets

TIMING OF TRANSFER IN RB-VERTICALLY-8-PIXEL ADDITION/G-VERTICALLY-16-PIXEL ADDITION

IMAGING APPARATUS WHICH ADDS A FIRST NUMBER OF R AND B PIXELS, AND ADDS A SECOND NUMBER OF G PIXELS

BACKGROUND OF THE INVENTION

1. Field of the Invention

The present invention relates to an imaging apparatus, and more particularly, to an imaging apparatus that includes solid-state image pickup elements.

2. Description of the Related Art

A solid-state imaging apparatus has been proposed that uses a line memory to perform vertical and horizontal addition of signal charge when reading out signal charge accumulated in pixels of solid-state image pickup elements (see Japanese Patent Application Laid-Open No. 2003-264844).

For example, with a camera capable of high-sensitivity picture taking, when its focus is adjusted in a low-light environment, pixels that are vertically added will be increased in order to obtain luminance required for focusing. This leads to problems of reduction of resolution mainly in the vertical direction and hence reduction of accuracy of focusing detection and/or exposure control.

SUMMARY OF THE INVENTION

The present invention has been made in view of such circumstances and has an object of providing an imaging apparatus that is capable of accurate focusing detection and/or exposure control even in a low-light environment.

To attain the above object, an imaging apparatus according to a first aspect of the present invention comprises image pickup elements for obtaining image signals and a control device which control read-out of image signals from the image pickup elements, wherein the image pickup elements comprise: light receiving elements which separate incident light into R, G and B colors and photoelectrically convert the incident light separated into the individual colors to obtain image signals including R, G and B signals corresponding to each of the colors; a vertical transfer channel for vertically transferring an image signal read out from the light receiving elements; and a horizontal transfer channel for horizontally transferring the vertically transferred image signal, and wherein the control device comprises: a read-out control device which applies a reading pulse to the light receiving elements to control read-out of the image signal from the light receiving elements;

a vertical transfer control device which controls vertical transfer of an image signal read out onto the vertical transfer channel;

a horizontal transfer control device which controls horizontal transfer of an image signal read out onto the horizontal transfer channel; and a driving control device which controls the read-out control device and the vertical transfer control device so that the R and B signals are each vertically added for a first number of vertical addition pixels and the G signals are vertically added for a second number of vertical addition pixels that is larger than the first number of vertical addition pixels.

According to the imaging apparatus of the first aspect, the number of discarded pixels is reduced or no pixel is discarded in reading out of G signals when a through-movie picture is taken so that G signals are vertically added for a number of pixels larger than that for R and B signals, thereby securing luminance of G signal required for automatic focus adjustment (AF) control or the like while minimizing reduction of resolution in the vertical direction.

The imaging apparatus according to a second aspect of the invention is the imaging apparatus according to the first aspect, wherein the second number of vertical addition pixels is twice the first number of vertical addition pixels.

According to the imaging apparatus of the second aspect, the number of discarded pixels is reduced or no pixel is discarded when reading out G signals to make G signals be vertically added for a number of pixels twice that for R and B signals, thereby securing luminance of G signal required for AF control or the like while minimizing reduction of resolution in the vertical direction.

An imaging apparatus according to a third aspect of the invention is the imaging apparatus of the second aspect, wherein on the light receiving elements, pixels each of which is assigned a color filter of any one of R, G and B colors are two-dimensionally arranged being diagonally displaced with respect to each other at an angle of 45°, the light receiving elements comprising: G1 and G2 lines which are formed only of G pixels in the horizontal direction; an RB line which is formed between the G1 and G2 lines and in which R pixels and B pixels are alternately positioned; and a BR line which is formed between the G2 and G1 lines and in which B pixels and R pixels are alternately positioned, wherein the read-out control device reads out signals discarding only B and R pixels in the BR line between the G2 and G1 lines when G signals read out from the G pixels are vertically added for a number of pixels twice the number of pixels for R and B signals which are read out from the R pixels and the B pixels, respectively.

According to the imaging apparatus of the third aspect, it is possible to discard some signals on the BR line when image signals are read out on the image pickup elements arranged in a so-called honeycomb arrangement to secure the speed of reading out image signals and vertically add G1 and G2 lines, thereby making G signals be vertically added for a number of pixels twice that for R and B signals.

An imaging apparatus according to a fourth aspect of the invention is the imaging apparatus according to the first to third aspects, wherein the image pickup elements further comprise a signal retention device which temporarily retains the vertically transferred R, G and B signals, and the driving control device sends the vertically transferred R, G and B signals into the signal retention device to vertically add the R, G and B signals.

According to the imaging apparatus of the fourth aspect, image signals output from the vertical transfer channels can be vertically added for each color in the signal retention device (or line memory).

An imaging apparatus according to a fifth aspect is the imaging apparatus according to the first to fourth aspects, wherein the driving control device controls the horizontal transfer control device to horizontally add the horizontally transferred image signals for a predetermined number of pixels for each color.

According to the imaging apparatus of the fifth aspect, luminance of G signal can be increased by horizontally adding image signals for a predetermined number of pixels (e.g., two pixels).

An imaging apparatus according to a sixth aspect of the invention is the imaging apparatus according to the first to fifth aspects, further comprising a focusing detection device which performs focusing detection based on the vertically added image signals.

According to the imaging apparatus of the sixth aspect, focusing detection and AF control can be performed with high precision by use of G signal of high luminance and high resolution.

An imaging apparatus according to a seventh aspect of the invention is the imaging apparatus according to the first to sixth aspects, further comprising an exposure control device which controls exposure based on the vertically added image signals.

According to the imaging apparatus of the seventh aspect, exposure control can be made with high precision by use of G signal of high luminance and high resolution.

An imaging apparatus according to an eighth aspect of the invention is the imaging apparatus according to the first to seventh aspects, further comprising a pixel addition mode switching device which switches a pixel addition mode between normal addition mode in which the R, G and B signals are each vertically added for the same number of pixels and G-pixel priority addition mode in which the R and B signals are each vertically added for a first number of vertical addition pixels and the G signals are vertically added for a second number of vertical addition pixels which is larger than the first number of vertical addition pixels.

According to the imaging apparatus of the eighth aspect, by switching the pixel addition mode to G-pixel priority addition mode depending on the situation, it is possible to secure luminance of G signal required for AF control and the like while minimizing reduction of resolution in the vertical direction.

An imaging apparatus according to a ninth aspect of the invention is the imaging apparatus according to the eighth aspect, further comprising a determination device which determines if a shooting environment is low light, wherein if the determination device determines that the shooting environment is low light, the pixel addition mode switching device switches the pixel addition mode to G-pixel priority addition mode.

According to the imaging apparatus of the ninth aspect, by switching the pixel addition mode to G-pixel priority addition mode when a shooting environment is dark (i.e., low light), it is possible to secure luminance of G signal required for AF control and the like while minimizing reduction of resolution in the vertical direction.

An imaging apparatus according to a tenth aspect of the invention is the imaging apparatus according to the eighth or ninth aspect, further comprising a sensitivity setting device which sets ISO sensitivity, wherein when the ISO sensitivity is set to a predetermined value or higher, the pixel addition mode switching device switches the pixel addition mode to G-pixel priority addition mode.

According to the imaging apparatus of the tenth aspect, when a shooting environment is dark (i.e., low light) and a high ISO sensitivity is set, it is possible to secure luminance of G signal required for AF control and the like while minimizing reduction of resolution in the vertical direction by switching the pixel addition mode to G-pixel priority addition mode.

An imaging apparatus according to an eleventh aspect of the invention is the imaging apparatus according to the first to tenth aspects, further comprising a G-capacity limiting device which limits the saturation capacity of pixels on the light receiving elements in which G signals are accumulated.

According to the imaging apparatus of the eleventh aspect, for example, by adjusting voltage for Overflow Drain (OFD), it is possible to adjust the upper limit of G signal that can be accumulated in G pixels to prevent occurrence of blooming of G signal in the vertical transfer channels and/or the signal retention device.

An imaging apparatus according to a twelfth aspect of the invention is the imaging apparatus according to the first to eleventh aspects, further comprising an image signal amplification device which amplifies image signals output from the image pickup elements, the image signal amplification device adjusting analog gain for R and B signals to be equal to analog gain for G signal multiplied by [the second number of vertical addition pixels/the first number of vertical addition pixels] while the pixel addition mode is set to G-pixel priority addition mode.

According to the imaging apparatus of the twelfth aspect, by adjusting analog gain for image signals, it is possible to prevent image output from having a greenish color, which occurs due to vertical addition of more G signals than R and B signals.

An imaging apparatus according to a thirteenth aspect is the imaging apparatus according to the first to eleventh aspects, further comprising a white balance adjustment device which adjusts white balance based on the image signals, the white balance adjustment device adjusting white balance gain for R and B signals to be equal to white balance gain for G signal multiplied by [the second number of vertical addition pixels/the first number of vertical addition pixels] while the pixel addition mode is set to G-pixel priority addition mode.

According to the imaging apparatus of the thirteenth aspect, by adjusting white balance gain for image signals, it is possible to prevent image output from having a greenish color, which occurs due to vertical addition of more G signals than R and B signals.

An imaging apparatus according to a fourteenth aspect is the imaging apparatus according to the first to eleventh aspects, further comprising an image display device which converts an image signal output from the image pickup elements into a video signal for display thereon; and a video signal amplification device which adjusts video signals for R and B signals to be equal to G signal multiplied by [the second number of vertical addition pixels/the first number of vertical addition pixels] while the pixel addition mode is set to G-pixel priority addition mode.

According to the imaging apparatus of the fourteenth aspect, by adjusting video signals, it is possible to prevent the color of a through-movie picture from being greenish, which occurs due to vertical addition of more G signals than R and B signals.

According to the present invention, the number of discarded pixels is reduced or no pixel is discarded in reading out of G signals when a through-movie picture is taken so that G signals are vertically added for a number of pixels larger than that for R and B signals, thereby securing luminance of G signal required for automatic focus adjustment (AF) control and/or exposure control (AE) while minimizing reduction of resolution in the vertical direction.

DETAILED DESCRIPTION OF THE PREFERRED EMBODIMENTS

Hereinafter, preferred embodiments of the imaging apparatus according to the present invention will be described with respect to the accompanying drawings.

[Configuration of the Imaging Apparatus]

Figure 1:
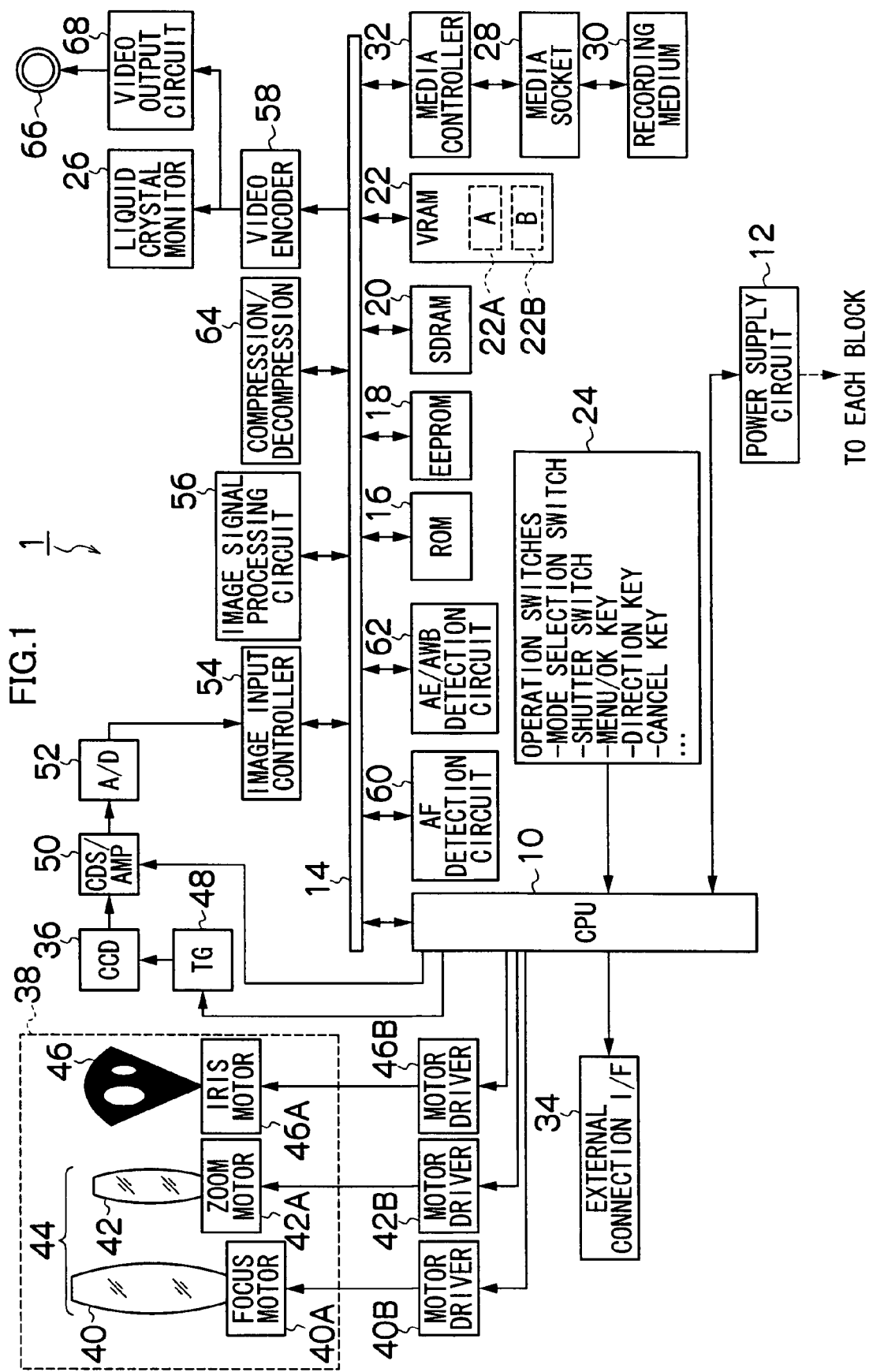
FIG. 1 shows a block diagram that illustrates the basic configuration of an imaging apparatus according to an embodiment of the invention.

FIG. 1 shows a block diagram that illustrates a basic configuration of the imaging apparatus according to an embodiment of the invention. An imaging apparatus 1 shown in FIG. 1 (hereinafter referred to as "camera 1") is a digital camera capable of recording and reproduction of still and/or moving images and its overall operation is controlled by a central processing unit (CPU) 10. The CPU 10 functions as a control device which controls the camera system in accordance with predetermined programs and also as a calculation device which performs various calculations, such as calculations for automatic exposure (AE), automatic focus adjustment (AF), and white balance (WB) adjustment. A power supply circuit 12 supplies power to the individual blocks of the camera system.

To the CPU 10, a Read Only Memory (ROM) 16 and an Electronically Erasable and Programmable Read-Only Memory (EEPROM) 18 are connected through a bus 14. The ROM 16 stores programs which are executed by the CPU 10 and various data or the like necessary for control, and the EEPROM 18 stores information on defects of CCD pixels, various constants and/or information associated with camera operations.

A memory (SDRAM: Synchronous Dynamic Random Access Memory) 20 is utilized as an expansion area for programs and a work area for calculation by the CPU 10, and also as a temporary storage area for image or audio data. A Video Random Access Memory (VRAM) 22 is temporary storage memory dedicated to image data, including an area A 22A and an area B 22B. The memory 20 and the VRAM 22 may be combined with each other.

The camera 1 has operation switches 24, including a mode selection switch, a shutter switch, a menu/OK key, a direction key, and a Cancel key. Signals from these operation switches are input to the CPU 10, which controls circuits in the camera 1 based on the input signals to control lens driving, image-taking operation, image processing, recording/reproduction of image data, and display on an image display device (a liquid crystal monitor) 26, for example.

The mode selection switch is an operation device for switching between picture-taking mode and playback mode. The shutter switch is an operation button for inputting an instruction to start image taking, being formed of a two-stroke switch including a S1 switch which turns on when being pressed halfway down and a S2 switch which turns on when being pressed all the way down. The menu/OK key is an operation key that combines functions as a menu button for commanding display of a menu on the screen of the image display device 26 and functions as an OK button for commanding confirmation and execution of what is selected. The direction key is an operation section (or a cursor movement operation device) for inputting designation of any of four directions, i.e., up, down, right and left, functioning as a button for selecting an item from a menu screen and/or commanding selection of various items for setting from a menu. The Up and Down keys of the direction key serves as zoom switches for use in shooting or reproduction zoom switches for use in image reproduction, and the Right and Left keys serves as buttons for advancing frames in playback mode (forward and reverse advance). The Cancel key is used for deleting an item of interest e.g., a selected item, or canceling what is commanded, or for returning to the previous operation status.

The image display device 26 is formed of a liquid crystal monitor capable of color display. The image display device 26 (hereinafter "liquid crystal monitor 26") can be used as an electronic finder for confirming an angle of view when taking an image and also as a device for reproducing and displaying a recorded image. The liquid crystal monitor 26 is also utilized as a display screen for a user interface, on which information such as menu information, items for selection, or settings is displayed as necessary. It is also possible to use a display device of other system, e.g., organic electro-luminescence (EL), instead of a liquid crystal monitor.

The camera 1 has a media socket (or a media attaching section) 28, to which a recording medium 30 can be attached. The format of the recording medium 30 is not particularly limited: it is possible to use various types of media, e.g., a semiconductor memory card represented by xD-Picture Card (a trademark) and Smart Media (a trademark), a portable small hard disk, magnetic disk, optical disk, or magneto-optical disk. A media controller 32 performs signal conversion required for passing input/output signals which are appropriate for the recording medium 30 to be attached in the media socket 28.

The camera 1 also has an external connection interface (or an external connection I/F) section 34 as a communication device for connecting to a personal computer or other external equipment. The camera 1 can communicate data with external equipment when being connected to the external equipment by use of a USB cable or the like not shown. The communication scheme is not limited to USB, of course: IEEE 1394, Bluetooth (a registered trademark), and other communication schemes may be applied.

Now, image-taking functions of the camera 1 will be described. When picture-taking mode is selected through the mode selection switch, power is supplied to an imaging section which includes color CCD solid-state image pickup elements 36 (hereinafter "CCD 36"), which makes the camera 1 ready for image taking.

A lens unit 38 is an optical unit that contains taking lenses 44 including a focus lens 40 and a zoom lens 42, and a mechanical shutter 46 which also serves as an aperture. Focusing of the taking lens 44 is made by moving the focus lens 40 with a focus motor 40A and zooming is made by moving the zoom lens 42 with a zoom motor 42A. Driving of the focus motor 40A and the zoom motor 42A is controlled by a focus motor driver 40B and a zoom motor driver 42B, respectively. The CPU 10 outputs control signals to the focus motor driver 40B and the zoom motor driver 42B to control them.

The aperture 46 is a so-called turret aperture, which varies an aperture value (or an F value) by rotating a turret plate on which aperture holes from F2.8 to F8 are bored. The aperture 46 is driven by an iris motor 46A. Driving of the iris motor 46A is controlled by an iris motor driver 46B. The CPU 10 outputs control signals to the iris motor driver 46B to control it.

Light that has passed through the lens unit 38 is focused on the light receiving surface of the CCD 36. On the light receiving surface of the CCD 36, a large number of photodiodes (or light receiving elements) are two-dimensionally arrayed and primary-color filters of red (R), green (G), and blue (B) are arranged in a certain arrangement pattern corresponding to each of the photodiodes. The CCD 36 has electronic shutter function for controlling the time for which electric charge is accumulated in each photodiode (i.e., a shutter speed). The CPU 10 controls the electric charge accumulation time in the CCD 36 by way of a timing generator (TG) 48. The CPU 10 also controls electric potential of Overflow Drain (OFD) in the CCD 36 to adjust the upper limit to signal charge which can be accumulated in the photodiodes constituting the CCD 36.

An image of a subject formed on the light receiving surface of the CCD 36 is converted by each photodiode to signal charge of an amount as a function of the amount of incident light therein. Signal charge accumulated in the individual photodiodes is sequentially read out as a voltage signal (or an image signal) as a function of the signal charge based on driving pulses (i.e., a reading pulse, a vertical transfer clock, and a horizontal transfer clock) which are given by the TG 48 in accordance with instructions from the CPU 10.

The signal output from the CCD 36 is sent to an analog processing section (CDS/AMP) 50, in which R, G and B signals for each pixel are sampled and held (correlated double sampling processing) and amplified, and then input to an A/D converter 52. The dot sequential R, G and B signals converted into digital signals by the A/D converter 52 are stored in the memory 20 via an image input controller 54.

An image signal processing circuit 56 processes the R, G and B signals stored in the memory 20 in accordance with instructions from the CPU 10. Specifically, the image signal processing circuit 56 functions as an image processing device including a synchronization circuit (i.e., a processing circuit for interpolating spatial misalignment of color signals associated with arrangement of color filters on a single-plate CCD and converting the color signals into simultaneous signals), a white balance adjustment circuit, a gamma correction circuit, a contour correction circuit, a luminance/color difference signal generation circuit, etc., and performs predetermined signal processing by utilizing the memory 20 in accordance with commands given by the CPU 10.

The RGB image data input to the image signal processing circuit 56 is converted to a luminance signal (or Y signal) and color difference signals (or Cr and Cb signals) at the image signal processing circuit 56 and is subjected to predetermined processing such as gamma correction. After being processed at the image signal processing circuit 56, the image data is stored in the VRAM 22.

When a taken image is output on the liquid crystal monitor 26, its image data is read from the VRAM 22 and sent to a video encoder 58 through a bus 14. The video encoder 58 converts the inputted image data to a video signal of a predetermined format for display (e.g., a color composite image signal of NTSC format) and outputs it to the liquid crystal monitor 26.

Image data representing one frame of image is rewritten with an image signal output by the CCD 36 alternately in the area A 22A and area B 22B of the VRAM 22. Written image data is read out from either one of area A 22A or area B 22B of the VRAM 22 which is an area other than the one in which image data has been rewritten. In this way, by periodically rewriting image data in the VRAM 22 and supplying an image signal generated from the image data to the liquid crystal monitor 26, an image currently being taken is displayed on the liquid crystal monitor 26 in real time. The user can check the angle of view for shooting on the image (or through-movie picture) displayed on the liquid crystal monitor 26.

When the shutter switch is pressed halfway and S1 is turns on, the camera 1 starts AE and AF processes. That is, an image signal output by the CCD 36 is A/D converted and then input to an AF detection circuit 60 and an AE/AWB detection circuit 62 via the image input controller 54.

The AE/AWB detection circuit 62 includes a circuit for dividing one screen into a plurality of sub-areas (e.g., 8×8 or 16×16) and summing RGB signals for each of the sub-areas, and provides values of summation to the CPU 10. The CPU 10 detects the lightness of a subject (or subject luminance) based on the summation values provided by the AE/AWB detection circuit 62 and calculates an exposure value (or a shooting EV value) appropriate for taking an image. The CPU 10 determines an aperture value and a shutter speed based on the determined exposure value and a predefined program chart and accordingly controls the electronic shutter and iris of the CCD 36 to obtain an appropriate exposure.

In automatic white balance adjustment, the AE/AWB detection circuit 62 also calculates an average summation value for each color of RGB signals and for each sub-area and provides the result to the CPU 10. With the R, B and G summation values obtained, the CPU 10 determines ratios of R/G and B/G for each sub-area and identifies the type of light source based on, e.g., distribution of the values of R/G and B/G in a color space of R/G and B/G axis coordinates. The CPU 10 then controls a gain value (or white balance gain) which is applied to R, G and B signals at the white balance adjustment circuit in accordance with the type of light source identified and applies correction to the signal for each color channel.

For AF control on the camera 1, contrast AF is applied, for example, which moves the focus lens 40 so that the high-frequency components of G signal of an image signal become maximum. That is, the AF detection circuit 60 consists of a high-pass filter for allowing only the high-frequency components of G signal to pass, an absolute value calculation section, an AF area extracting section for taking out signals within a focus area which is preset within the screen (e.g., the center of the screen), and a summation section for summing absolute value data within the AF area.

Data on a summation value determined by the AF detection circuit 60 is provided to the CPU 10. The CPU 10 calculates a focus evaluation value (or AF evaluation value) at a plurality of AF detection points while moving the focus lens 40 by controlling the focus motor driver 40B and determines a lens position at which the evaluation value is maximum to be the in-focus position. The CPU 10 then controls the focus motor driver 40B to move the focus lens 40 to the in-focus position determined. Calculation of an AF evaluation value may also utilize luminance signal (or Y signal), not limited to utilization of G signal.

When the shutter switch is pressed halfway down and S1 turns on, AE/AF process is performed, and when the shutter switch is pressed all the way down and S2 turns on, image-taking operation for the purpose of recording is started. Image data obtained in response to turning-on of S2 is converted to luminance/color difference signal (or Y/C signal) and subjected to predetermined processing such as gamma correction at the image signal processing circuit 56, and then stored in the memory 20.

The Y/C signal stored in the memory 20 is compressed in conformity with a predetermined format by a compression/decompression circuit 64 and then recorded on a recording medium 30 via the media controller 32. For example, a still image may be recorded as an image file of Joint Photographic Experts Group (JPEG) format.

When playback mode is selected with the mode selection switch, compressed data of the last image file that is recorded in the recording medium 30 (i.e., the image file last recorded) is read out. If the image file last recorded is a still image file, the compressed image data read out is expanded to an uncompressed YC signal at the compression/decompression circuit 64, converted to a signal for display at the image signal processing circuit 56 and the video encoder 58, then output on the liquid crystal monitor 26. Consequently, the image in the image file is displayed on the screen of the liquid crystal monitor 26.

While a still image of one frame is reproduced (including while the first frame of a moving image is reproduced), a reproduced image file can be changed by manipulating the Right or Left key of the direction key (i.e., forward and reverse frame advance). An image file positioned at where the frame advance stopped is read from the recording medium 30 and a still or moving image is reproduced and displayed on the liquid crystal monitor 26 in a manner similar to the description above.

When an external display such as a personal computer or a television is connected to the camera 1 via a video input/output terminal 66 in playback mode, an image file recorded in the recording medium 30 is processed by the video output circuit 68 to be reproduced and displayed on the external display.

[Configuration of the CCD 36]

Figure 2:
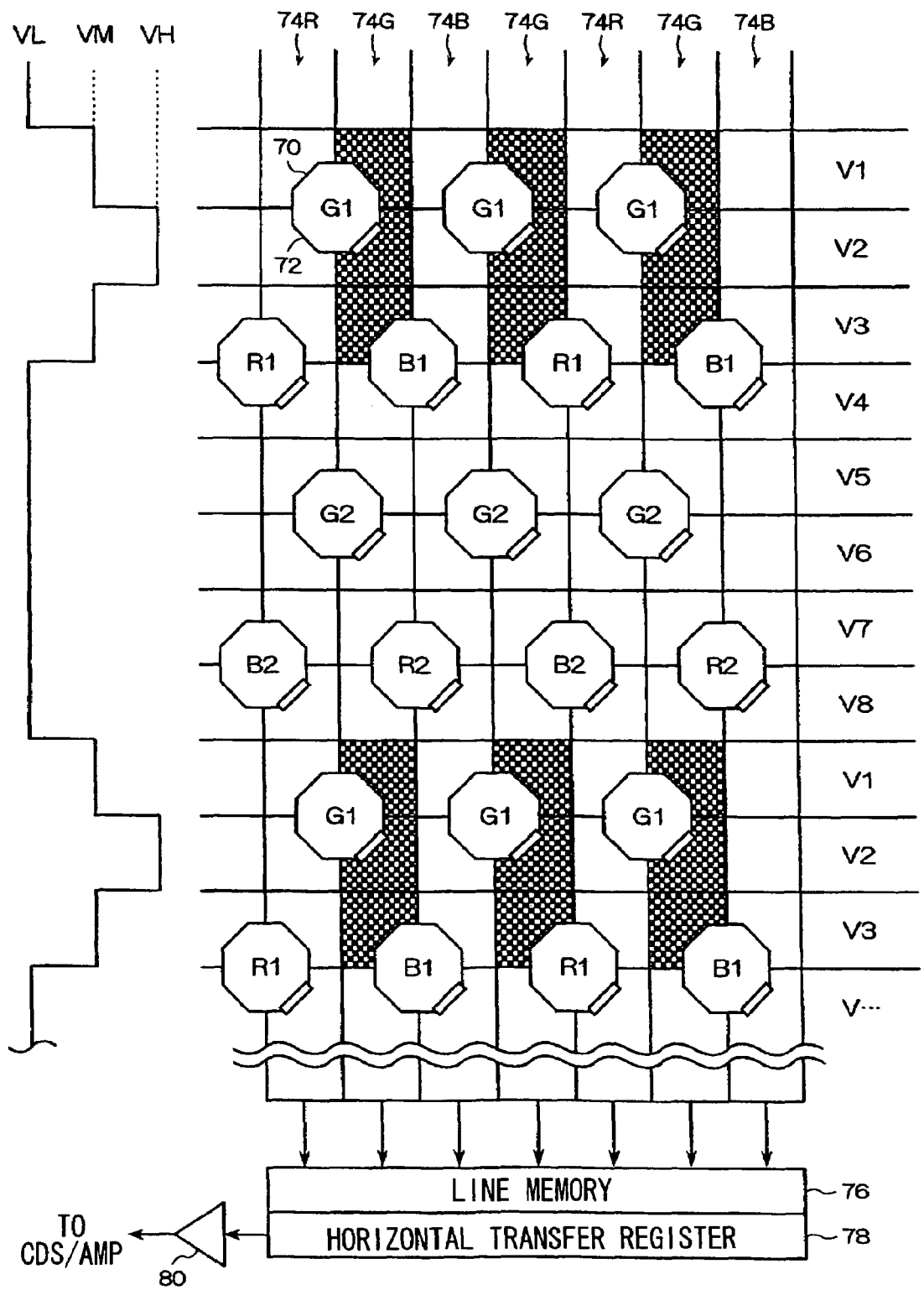
FIG. 2 is a plan view that schematically illustrates a portion of CCD 36.

Now, the basic configuration of the CCD 36 will be described with reference to FIG. 2 and subsequent figures. FIG. 2 is a plan view that schematically shows a portion of the CCD 36. As illustrated in FIG. 2, on the light receiving surface of the CCD 36, photodiodes 70 are arranged in a so-called honeycomb arrangement in which they are displaced by half the space between them in both the horizontal and vertical directions. On the photodiodes 70, color filters of the three primary colors, i.e., R, G and B, are arranged one-to-one. As illustrated in FIG. 2, for the color filters, a G-square and RB-complete-checkerwise arrangement pattern is employed where G color filters are arranged in an approximately square lattice and R and B color filters are alternately arranged at the center of squares formed by Gs that are adjacent to each other horizontally and vertically. The following description will denote the photodiodes 70 as pixels R1, G1, B1 and so on according to the color of a color filter of interest.

The photodiodes 70 may also be arranged in a square lattice, not limited to the honeycomb arrangement. When the photodiodes 70 are arranged in a square lattice, color filters may be arranged in a Bayer pattern, a G-stripe and RB-complete-checkerwise pattern, etc. The Bayer pattern is a pattern which positions G color filters at two diagonal corners and R and B color filters at the other diagonal corners. The G-stripe and RB-complete-checkerwise pattern positions G color filters vertically in a column and different colors (i.e., R and B) on the sides of this vertical G-stripe and makes diagonal positions in neighboring two rows the same color.

The type of color filter is not limited to the three primary colors of R, G and B: color filters of complementary colors may also be used. In this case, however, processing for converting a complementary color to a primary color will be added to image signal processing.

[Method for Reading Out Signal Charge Accumulated in a Pixel]

As illustrated in FIG. 2, each pixel has a reading gate 72 for reading out signal charge accumulated therein. The reading gate 72 is opened and closed in response to a reading pulse from the TG 48. When the reading gate 72 is opened, signal charges accumulated in R, G and B pixels (i.e., R, G and B signals) are read out through the reading gate 72 onto vertical transfer channels 74R, 74G and 74 B, respectively, and vertically transferred in accordance with a vertical transfer clock applied by the TG 48.

A line memory 76 is provided at the final stage of the vertical transfer channels 74R, 74G and 74B, and in parallel with the line memory 76, a horizontal transfer register 78 is provided. The signal charges (i.e., R, G and B signals) that has been vertically transferred are sent to the line memory 76 in which they are each vertically added for a predetermined number of pixels. After being vertically added in the line memory 76, the signal charges are horizontally added in the horizontal transfer register 78 for a predetermined number of pixels (e.g., two pixels) and horizontally transferred. The signal charges thus horizontally added are amplified by an amplifier 80 and sent to the analog processing section (CDS/AMP) 50.

[Pixel Addition Modes]

The imaging apparatus of the embodiment has several pixel addition modes which are different in the number of pixels for vertical and horizontal addition of signal charge (i.e., R, G and B signals) output from the CCD 36. The pixel addition modes will be each described below.

[R/G/B-Vertically-2-Pixel Addition Mode]

Figure 3:
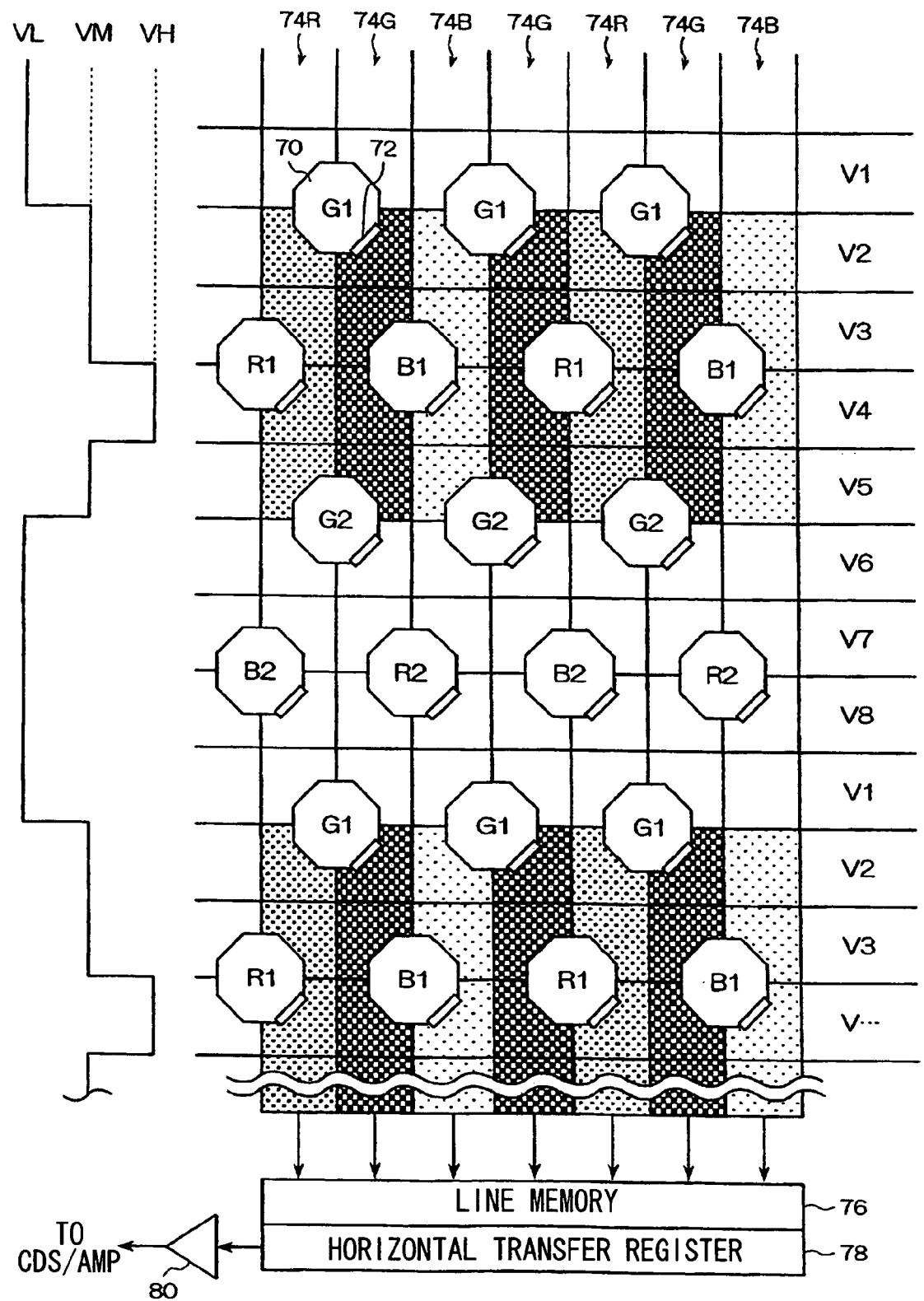
FIG. 3 is a plan view illustrating normal addition mode.

On the left part of FIGS. 2 and 3, a reading pulse applied by the TG 48 is illustrated. In the examples shown in FIGS. 2 and 3, for G pixels, one pixel G2 is discarded out of two pixels G1 and G2 and signal charges accumulated in pixels G1 (or G1 signals) are vertically added for two pixels. For R and B pixels, one pixel R2 and B2 is discarded out of two pixels, R1 and R2, and B1 and B2, respectively, and signal charges accumulated in pixels R1 and B1 (or R1 and B1 signals, respectively) are vertically added for two pixels. That is, in R/G/B-vertically-2-pixel addition mode, 2/4 pixel addition is performed which discards two pixels R2 and B2 out of four pixels G1, G2, R1 and B2, or G1, G2, B1 and R2.

In R/G/B-vertically-2-pixel addition mode, when luminance required for AF control or the like cannot be secured, G1 signals are added for four pixels (i.e., R/G/B-vertically-4-pixel addition mode). In R/G/B-vertically-2-pixel addition mode and/or R/G/B-vertically-4-pixel addition mode, it is possible to secure luminance of G signal required for AF control or the like by vertically adding G1 signals for two or four pixels. The number of pixels for vertical addition is not limited to two or four.

[R/B-Vertically-4-Pixel and G-Vertically-8-Pixel Addition Mode]

Figure 4:
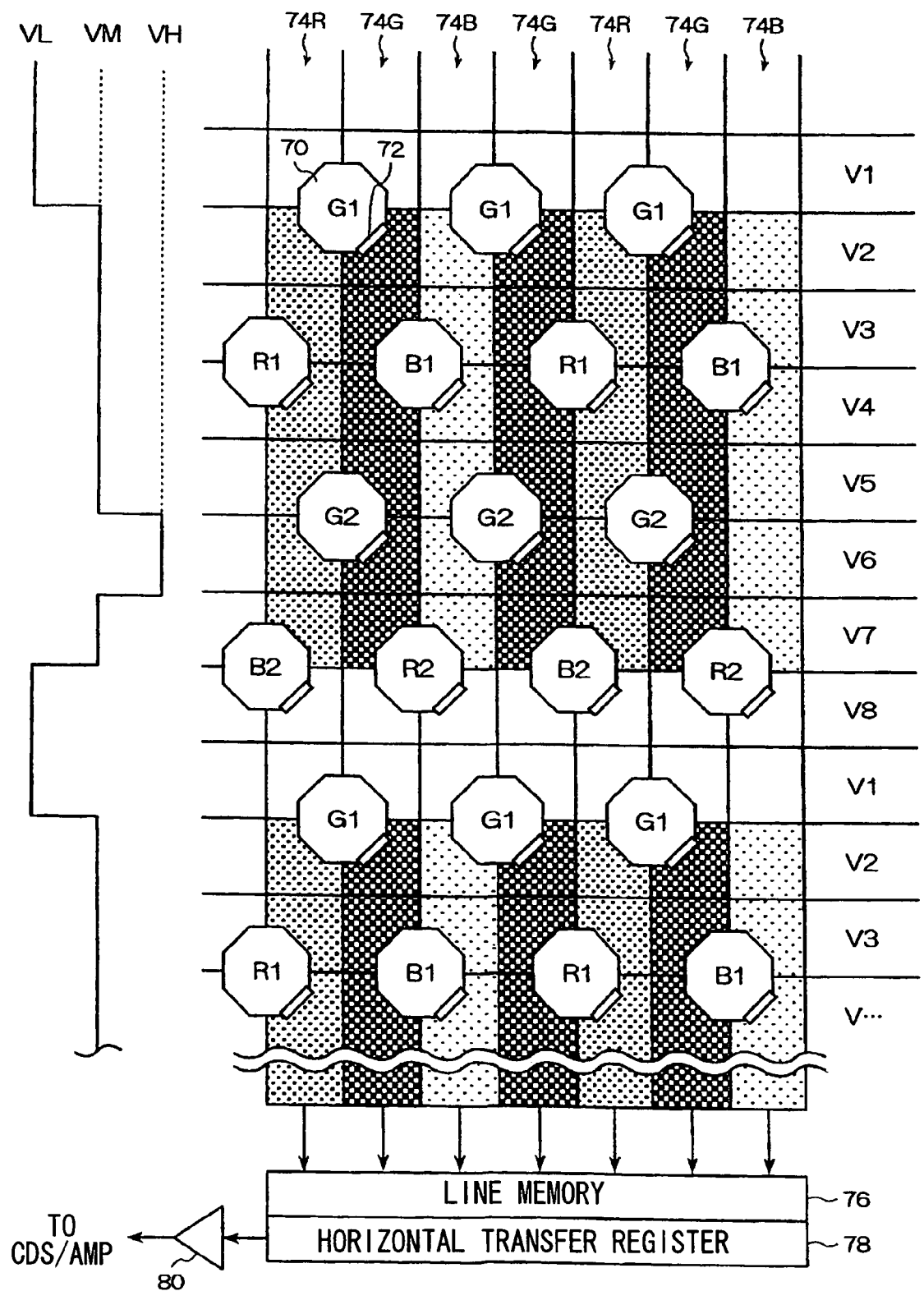
FIG. 4 is a view illustrating G-pixel double addition mode.
Figure 5:
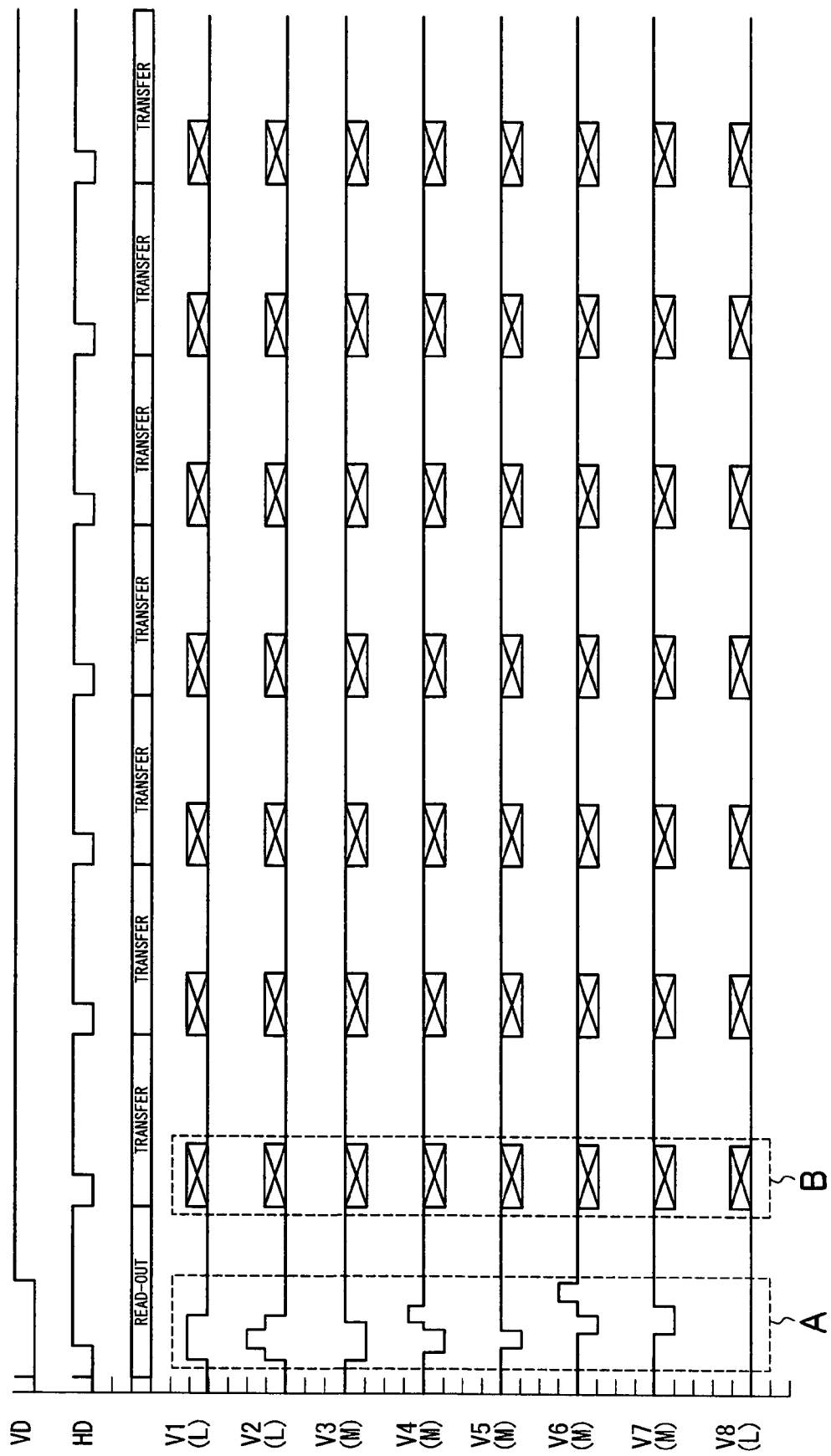
FIG. 5 shows a timing chart illustrating driving pulses applied from a TG 48 to the CCD 36.
Figure 6:
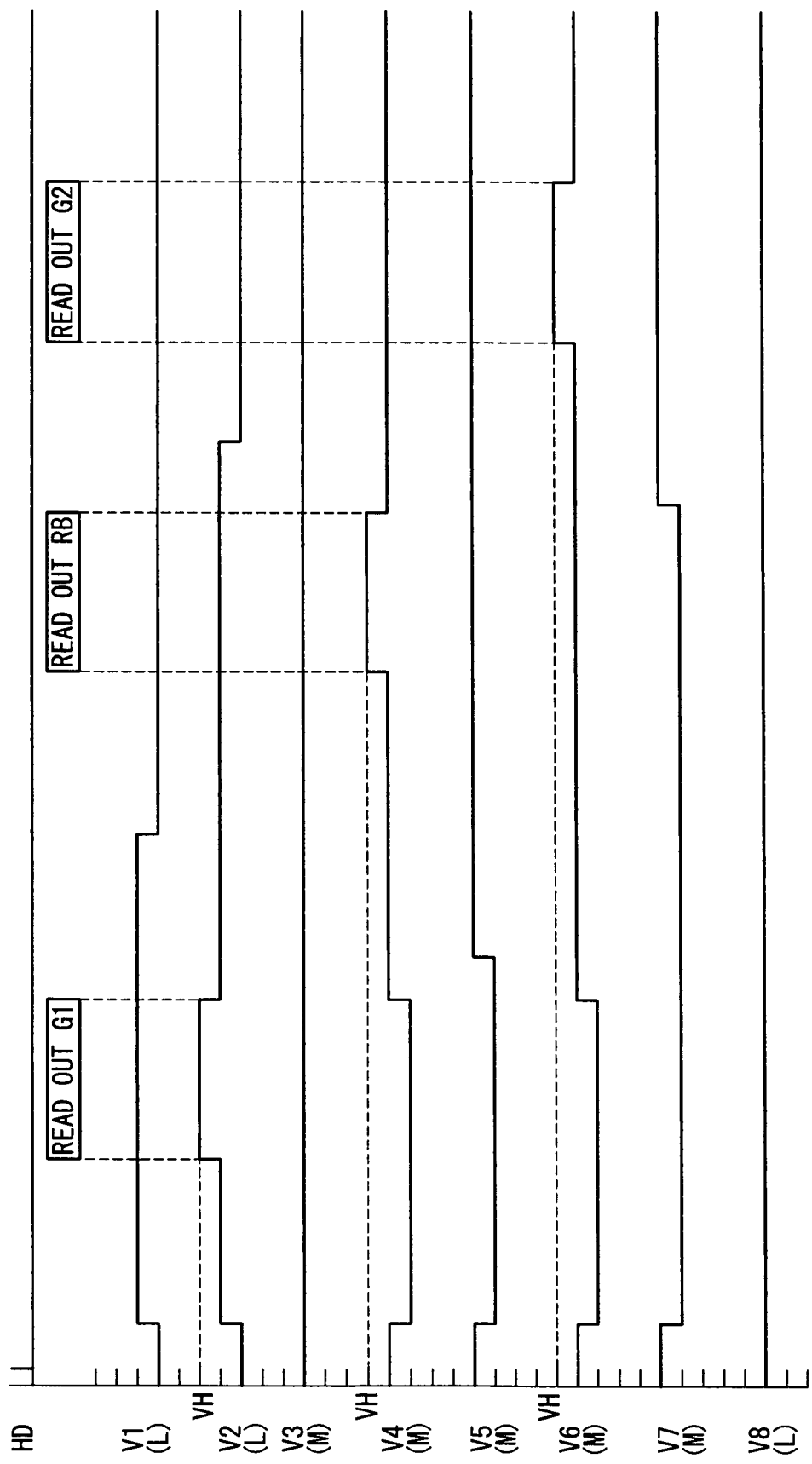
FIG. 6 shows a timing chart illustrating part A of FIG. 5, i.e., reading pulses.
Figure 7:
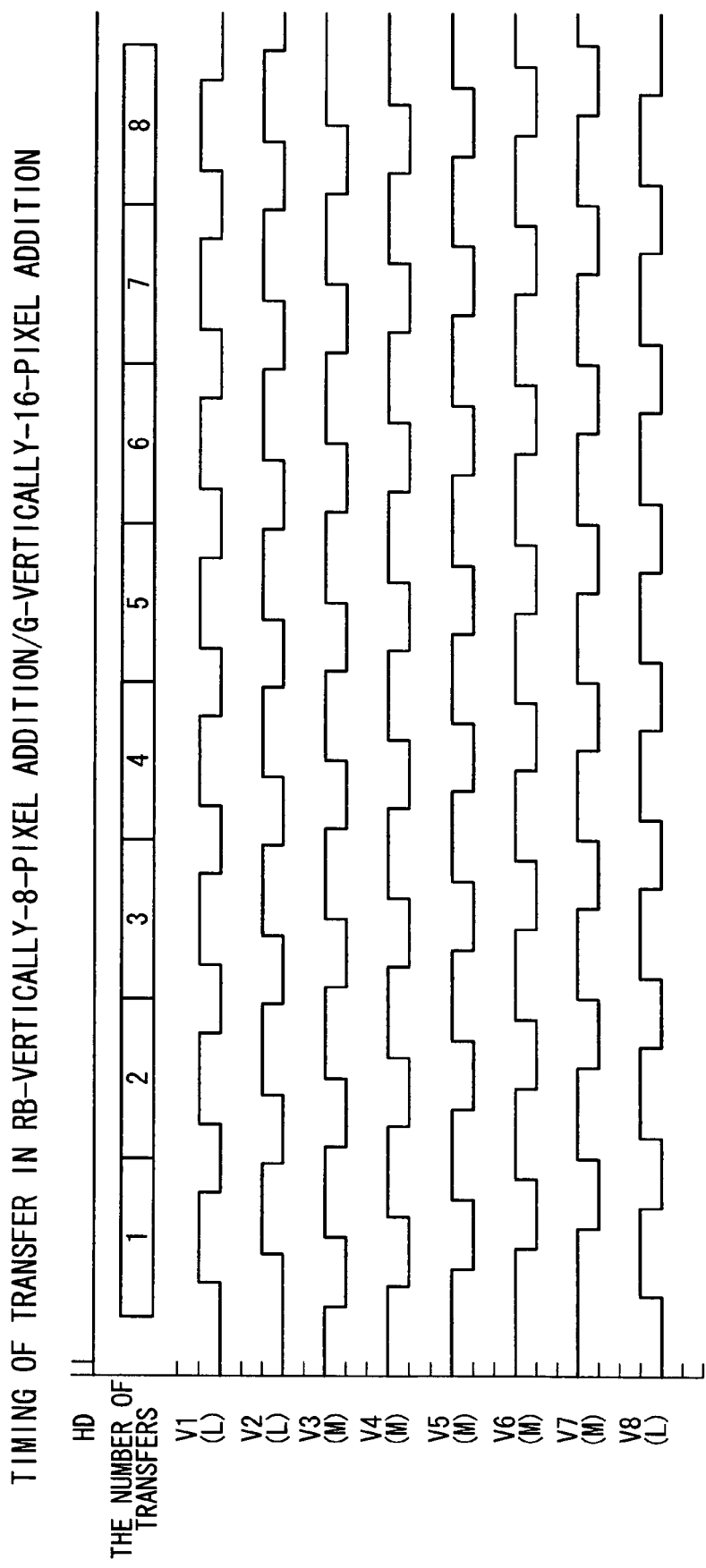
FIG. 7 shows a timing chart illustrating part B of FIG. 5, i.e., vertical transfer clocks.

FIG. 4 illustrates R/B-vertically-4-pixels and G-vertically-8-pixel addition mode. FIG. 5 shows a timing chart illustrating driving pulses applied from the TG 48 to the CCD 36. FIG. 6 shows a timing chart illustrating part A of FIG. 5 (i.e., reading pulses), and FIG. 7 shows a timing chart illustrating part B of FIG. 5 (i.e., vertical transfer clocks).

As illustrated in FIG. 6, initially, when vertical reading signal V2 becomes VH, the reading gate 72 is opened, causing G1 signal to be read onto the vertical transfer channels 74G. Then, when vertical reading signal V4 becomes VH, the reading gate 72 of pixels R1 and B1 is opened, causing R1 and B1 signals to be read out onto the vertical transfer channels 74R and 74B, respectively. That is, for R and B signals, as illustrated above with FIGS. 2 and 3, one pixel R2 and B2 is discarded out of two pixels R1 and R2, and B1 and B2, respectively. When vertical reading signal V6 becomes VH, the reading gate 72 of pixels G2 is opened, so that signal charges accumulated in pixels G2 (or G2 signals) are read out onto the vertical transfer channels 74G. The G1 and G2 signals read out are vertically transferred in accordance with the vertical transfer clock illustrated in FIG. 7. The G0 and G2 signals are then sent to the line memory 76, in which they are vertically added for eight pixels in total. Meanwhile, R1 and B1 signals are transferred on the vertical transfer channels 74R and 74B, respectively, to the line memory 76 in accordance with the vertical transfer clock shown in FIG. 7 and each vertically added for four pixels.

In R/B-vertically-4-pixel and G-vertically-8-pixel addition mode, when luminance necessary for AF control and the like cannot be secured, G1 and G2 signals are vertically added for 16 pixels in total and R1 and B1 signals are each vertically added for eight pixels (or R/B-vertically-8-pixel and G-vertically-16-pixel addition mode). The number of G pixels for vertical addition may be more than 8 or 16 pixels.

According to the embodiment, it is possible to double the number of pixels for vertical addition of G signals by vertically adding G1 and G2 signals so that luminance of G signal required for AF control or the like can be secured without reducing resolution in the vertical direction.

Figure 8:
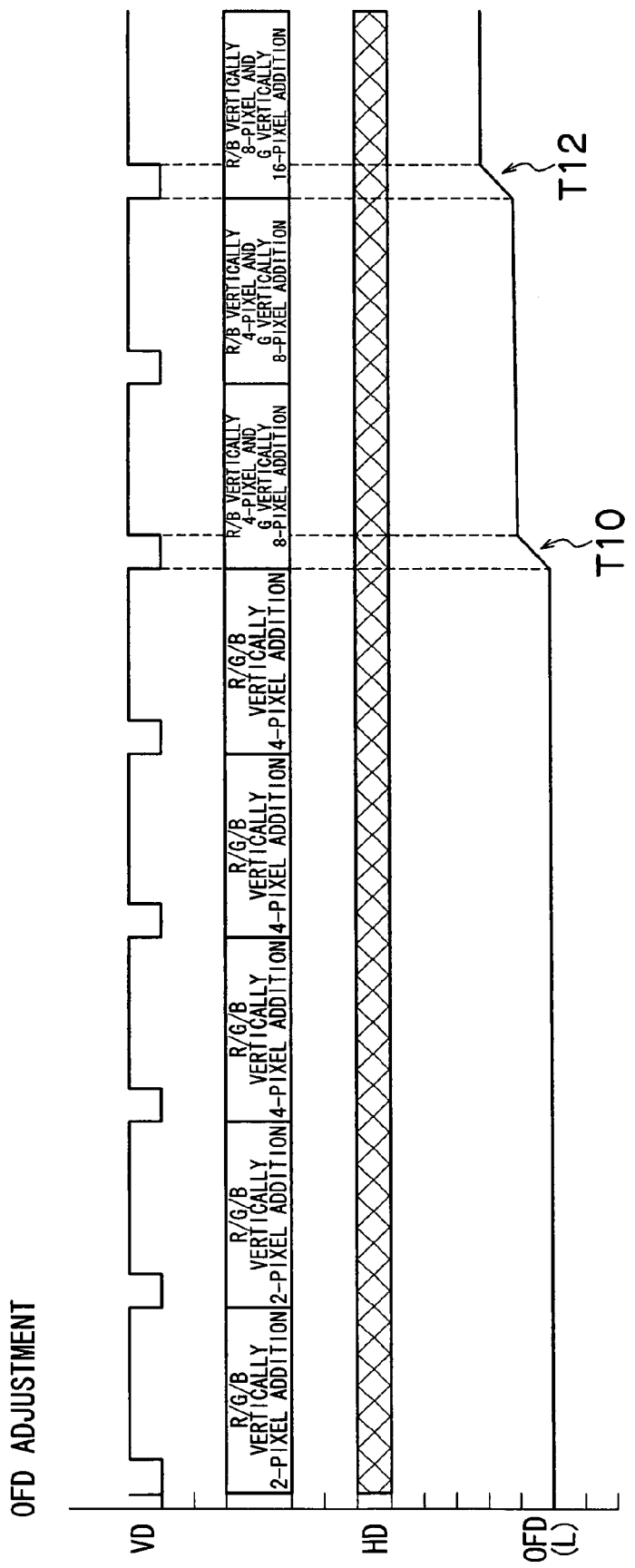
FIG. 8 shows a timing chart illustrating the relationship between switching of pixel addition modes and OFD.

In R/B-vertically-4-pixel and G-vertically-8-pixel addition mode or R/B-vertically-8-pixel and G-vertically-16-pixel addition mode, vertically added G signal might be excessive depending on position in a taken image because a large number of pixels are vertically added. Accordingly, the CPU 10 makes the voltage for OverFlow Drain (OFD) higher than that in taking a normal through-movie picture, for example, when the pixel addition mode is switched from R/G/B-vertically-4-pixel addition mode to R/B-vertically-4-pixel and G-vertically-8-pixel addition mode, as illustrated at T10 in FIG. 8. The CPU 10 also increases the OFD voltage when R/B-vertically-4-pixel and G-vertically-8-pixel addition mode is switched to RIB-vertically-8-pixel and G-vertically-16-pixel addition mode (T12). This can reduce the upper limit of G1 and G2 signals to prevent occurrence of blooming of G signal in the vertical transfer channel 74G and/or the line memory 76. The OFD voltage may be increased in accordance with the number of pixels for vertical addition when there is an increase in the number of pixels for vertical addition, e.g., when R/G/B-vertically-2-pixel addition mode is switched to R/G/B-vertically-4-pixel addition mode.

[Automatic Focus Adjustment Calculation Process (AF)]

Figure 9:
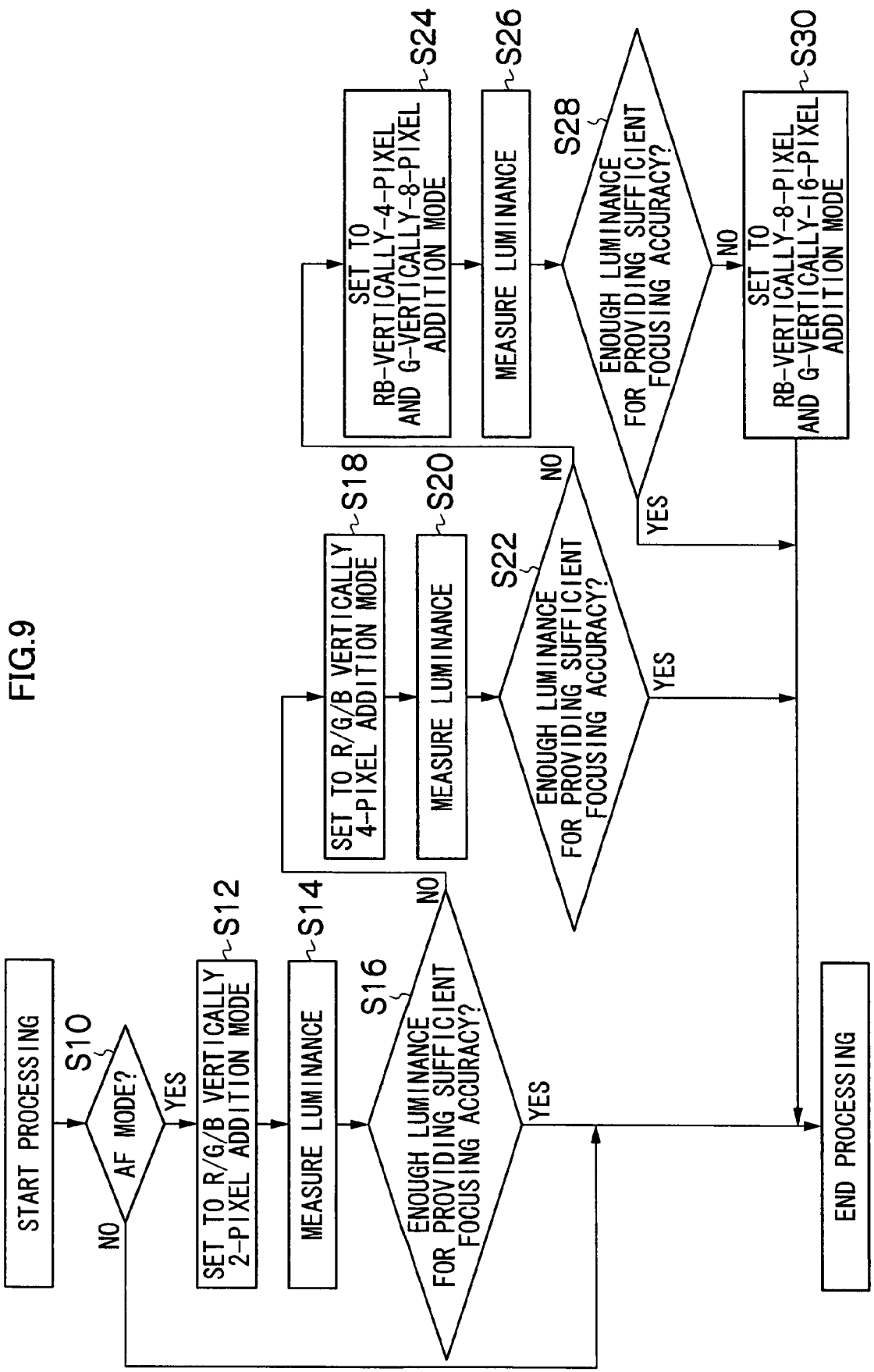
FIG. 9 shows a flowchart illustrating the flow of processing at a CPU 10 for when a pixel addition mode is switched in AF control.

Now, description will be given of the flow of processing at the CPU 10 which is performed when a pixel addition mode is changed in the process of AF control with reference to the flowchart shown in FIG. 9. First, the camera 1 is switched on and a through-movie picture is displayed on the liquid crystal monitor 26. When the camera 1 is placed in AF mode (YES at step S10), the pixel addition mode is set to R/G/B-vertically-2-pixel addition mode (step S12), and luminance of G signal is measured (step S14). If it is determined that luminance of G signal is enough for providing sufficient accuracy of focusing (YES at step S16), switching of a pixel addition mode is terminated.

However, if it is determined that luminance of G signal is not enough for providing sufficient focusing accuracy (NO at step S16), the pixel addition mode is set to R/G/B-vertically-4-pixel addition mode (step S18), and luminance of G signal is measured (step S20). Then, if it is determined that luminance of G signal is enough for providing sufficient focusing accuracy (YES at step S22), switching of pixel addition modes is terminated.

However, if it is determined that luminance of G signal is not enough for providing sufficient focusing accuracy (NO at step S22), the pixel addition mode is set to R/B-vertically-4-pixel and G-vertically-8-pixel addition mode (step S24), and luminance of G signal is measured (step S26). If it is determined that luminance of G signal is enough for providing sufficient focusing accuracy (YES at step S28), switching of a pixel addition mode is terminated.

However, if it is determined that luminance of G signal is not enough for providing sufficient focusing accuracy (NO at step S28), the pixel addition mode is set to R/B-vertically-8-pixel and G-vertically-16-pixel addition mode (step S30), and switching of pixel addition modes is terminated.

According to the embodiment, it is possible to increase luminance of G signal by changing a pixel addition mode when a shooting environment is dark (or low light) and sufficient luminance of G signal cannot be obtained. This can secure luminance of G signal required for AF control. Also, since resolution in the vertical direction does not increase or decrease through vertical addition in R/G/B-vertically-4-pixel addition mode at step S18 and R/B-vertically-4-pixel and G-vertically-8-pixel addition mode at step S24, AF accuracy can be improved as compared to when vertical addition is performed by discarding G2 signals.

Although this embodiment uses G signal to perform AF control, the present invention is also applicable to a case where other image signal, e.g., Y signal, is used to perform AF control.

[Automatic Exposure Calculation Process (AE)]

Figure 10:
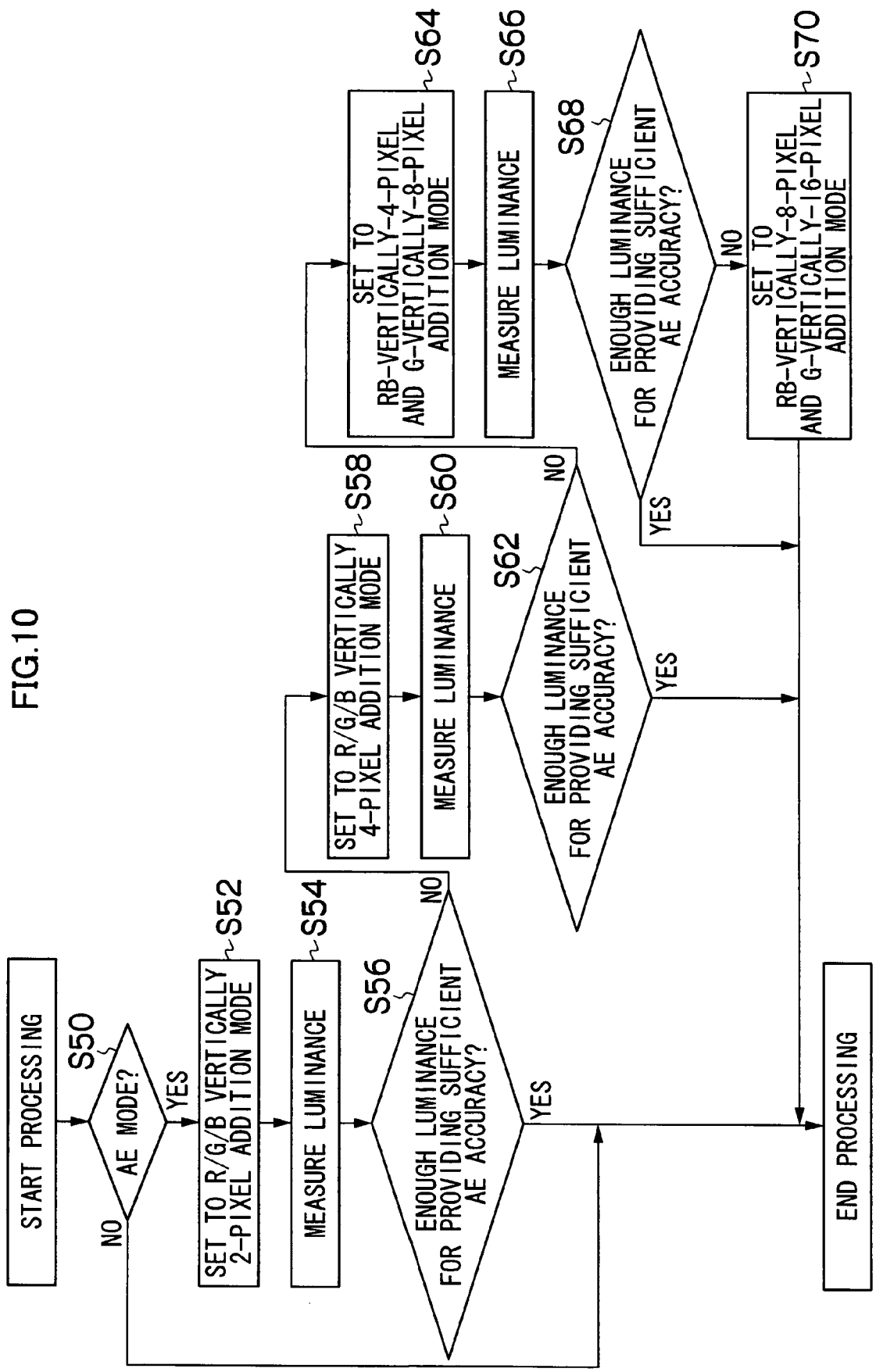
FIG. 10 shows a flowchart illustrating the flow of processing at the CPU 10 for when a pixel addition mode is switched in AE control.

Now, description will be given of the flow of processing at CPU 10 which is performed when a pixel addition mode is switched in the process of AE control with reference to the flowchart shown in FIG. 10. First, the camera 1 is switched on and a through-movie picture is displayed on the liquid crystal monitor 26. When the camera 1 is placed in AE mode (YES at step S50), the pixel addition mode is set to R/G/B-vertically-2-pixel addition mode (step S52), and luminance of G signal is measured (step S54). If it is determined that luminance of G signal is enough for providing sufficient AE accuracy (YES at step S56), switching of pixel addition modes is terminated.

However, if it is determined that luminance of G signal is not enough for providing sufficient AE accuracy (NO at step S56), the pixel addition mode is set to R/G/B-vertically-4-pixel addition mode (step S58), and luminance of G signal is measured (step S60). If it is determined that luminance of G signal is enough for providing sufficient AE accuracy (YES at step S62), switching of pixel addition modes is terminated.

However, if it is determined that luminance of G signal is not enough for providing sufficient AE accuracy (NO at step S62), the pixel addition mode is set to R/B-vertically-4-pixel and G-vertically-8-pixel addition mode (step S64), and luminance of G signal is measured (step S66). If it is determined that luminance of G signal is enough for providing sufficient AE accuracy (YES at step S68), switching of pixel addition modes is terminated.

However, if it is determined that luminance of G signal is not enough for providing sufficient AE accuracy (NO at step S68), the pixel addition mode is set to R/B-vertically-8-pixel and G-vertically-16-pixel addition mode (step S70), and switching of pixel addition modes is terminated.

According to the embodiment, it is possible to increase luminance of G signal by changing a pixel addition mode when a shooting environment is dark (i.e., low light) and enough luminance of G signal cannot be obtained. This can secure luminance of G signal required for AE control. Also, since resolution in the vertical direction does not increase or decrease through vertical addition in R/G/B-vertically-4-pixel addition mode at step S58 and R/B-vertically-4-pixel and G-vertically-8-pixel addition mode at step S64, AE accuracy can be improved as compared to when vertical addition is performed by discarding G2 signals.

[Switching of Pixel Addition Modes According to ISO Sensitivity]

Figure 11:
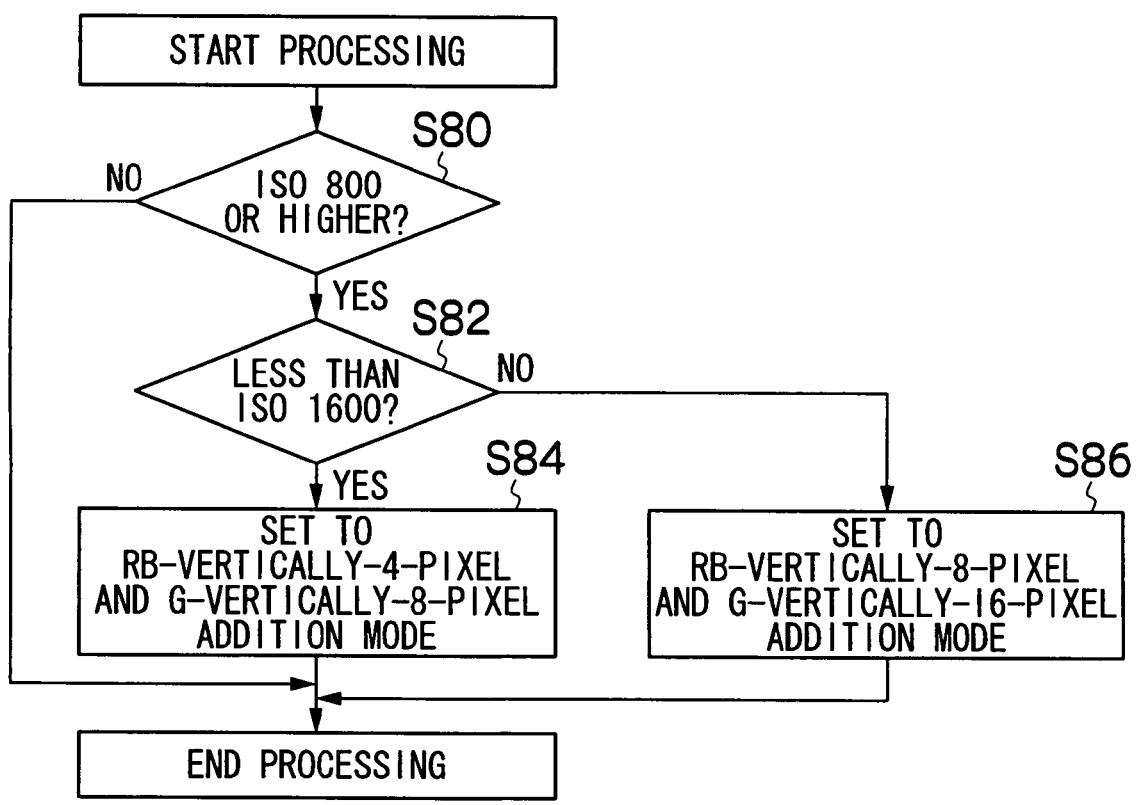
FIG. 11 shows a flowchart illustrating the flow of processing at the CPU 10 for when a pixel addition mode is switched in accordance with ISO sensitivity.

Now, description will be given of the flow of processing at the CPU 10 which is performed when a pixel addition mode is switched according to the ISO sensitivity of the camera 1 with reference to the flowchart shown in FIG. 11. First, the camera 1 is switched on and a through-movie picture is displayed on the liquid crystal monitor 26. Then, when the sensitivity of the camera 1 is set to ISO 800 or higher (YES at step S80), if the sensitivity is less than ISO 1600 (YES at step S82), the pixel addition mode is set to R/B-vertically-4-pixel and G-vertically-8-pixel addition mode (step S84), and switching of pixel addition modes is terminated. Meanwhile, if the sensitivity of the camera 1 is set to ISO 1600 or higher (NO at step S82), the pixel addition mode is set to R/B-vertically-8-pixel and G-vertically-16-pixel addition mode (step S86), and switching of pixel addition modes is terminated.

According to the embodiment, it is possible to increase luminance of G signal to secure luminance of G signal required for AF and AE control by changing a pixel addition mode when a shooting environment is dark (i.e., low light) and a high ISO sensitivity is set.

[Video Output Adjustment Method for a Case G Signals are Double Added]

In the R/B-vertically-8-pixel and G-vertically-16-pixel addition mode or R/B-vertically-8-pixel and G-vertically-16-pixel addition mode described above, since G signals are vertically added for a number of pixels twice that for R or B signals, it is necessary to adjust the image of a through-movie picture displayed on the liquid crystal monitor 26 when a through-movie picture is displayed. The following description will collectively refer to pixel addition modes in which G signals are vertically added for a number of pixels twice that for R or B signals, e.g., R/B-vertically-8-pixel and G-vertically-16-pixel addition mode or R/B-vertically-8-pixel and G-vertically-16-pixel addition mode, as "G-pixel double addition mode", and collectively refer to pixel addition modes in which the number of pixels for vertical addition of G signal is equal to that for R or B signals, e.g., R/G/B-vertically-2-pixel addition mode or R/G/B-vertically-4-pixel addition mode, as "normal addition mode".

[Adjustment Method Based on Analog Gain]

Figure 12:
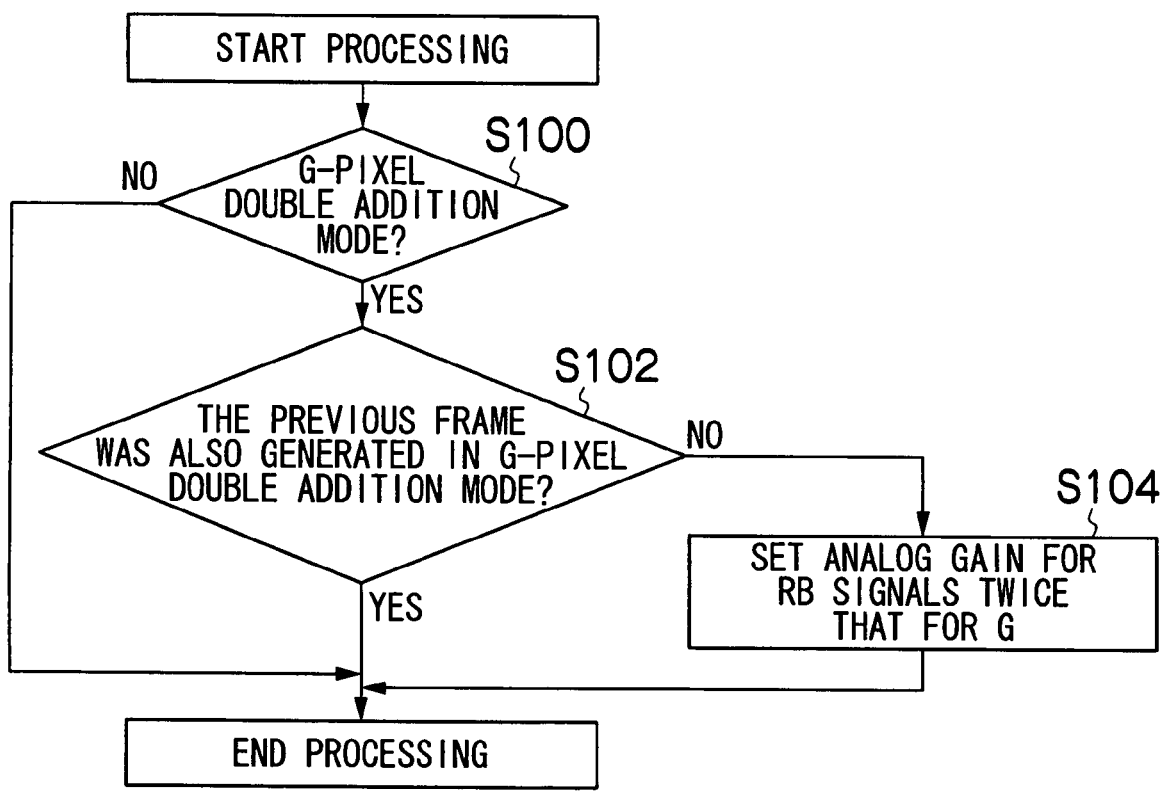
FIG. 12 shows a flowchart illustrating a first embodiment of an image output adjustment method.
Figure 13:
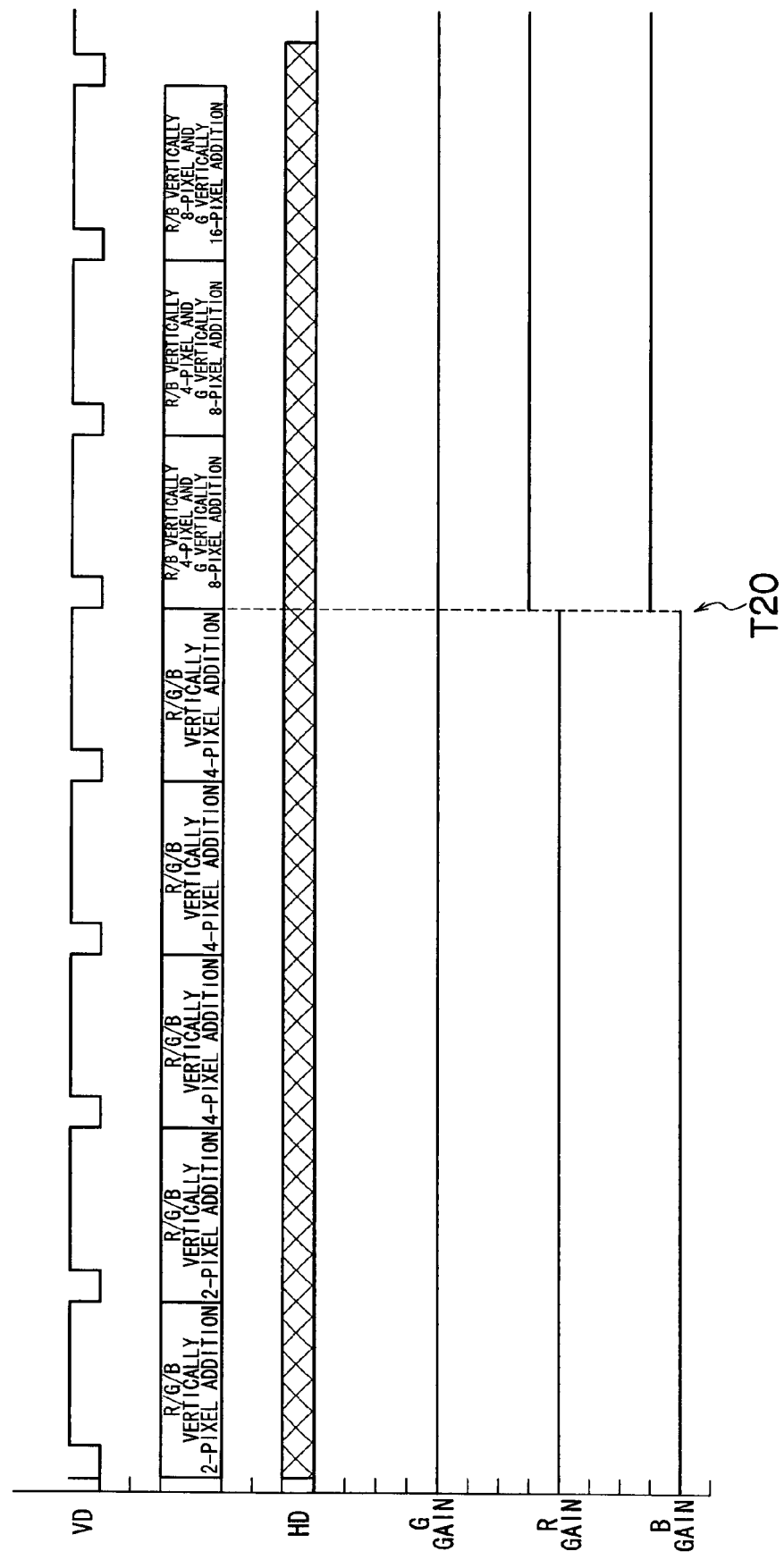
FIG. 13 shows a timing chart illustrating timing of analog gain switching.

FIG. 12 shows a flowchart illustrating a first embodiment of an image output adjustment method. First, while a through-movie picture is displayed on the liquid crystal monitor 26, the CPU 10 determines whether the pixel addition mode is G-pixel double addition mode (step S100). If the pixel addition mode is G-pixel double addition mode (YES at step S100), it is determined whether the pixel addition mode which was set in generating the image of the frame preceding the through-movie picture was also G-pixel double addition mode (step S102). The time at which normal addition mode is changed to G-pixel double addition mode is stored in the memory 20 by the CPU 10, for example. If the pixel addition mode for generating the image of the previous frame was also G-pixel double addition mode (YES at step S102), processing is terminated. On the other hand, if the pixel addition mode for generating the image of the previous frame was not normal addition mode as illustrated at time T20 in FIG. 13 (NO at step S102), analog gain which is applied to R and B signals by the analog processing section (CDS/AMP) 50 is changed to about twice that for G signal (step S104). If the pixel addition mode has been switched from G-pixel double addition mode to normal addition mode, analog gain applied to R and B signals is changed to about half of that before the switching of pixel addition modes. This can prevent the color of the through-movie picture from being greenish, which occurs as a result of vertical addition of G signals for a number of pixels twice that for R and B signals.

[Adjustment Method Based on Digital Gain (or White Balance Gain)]

Figure 14:
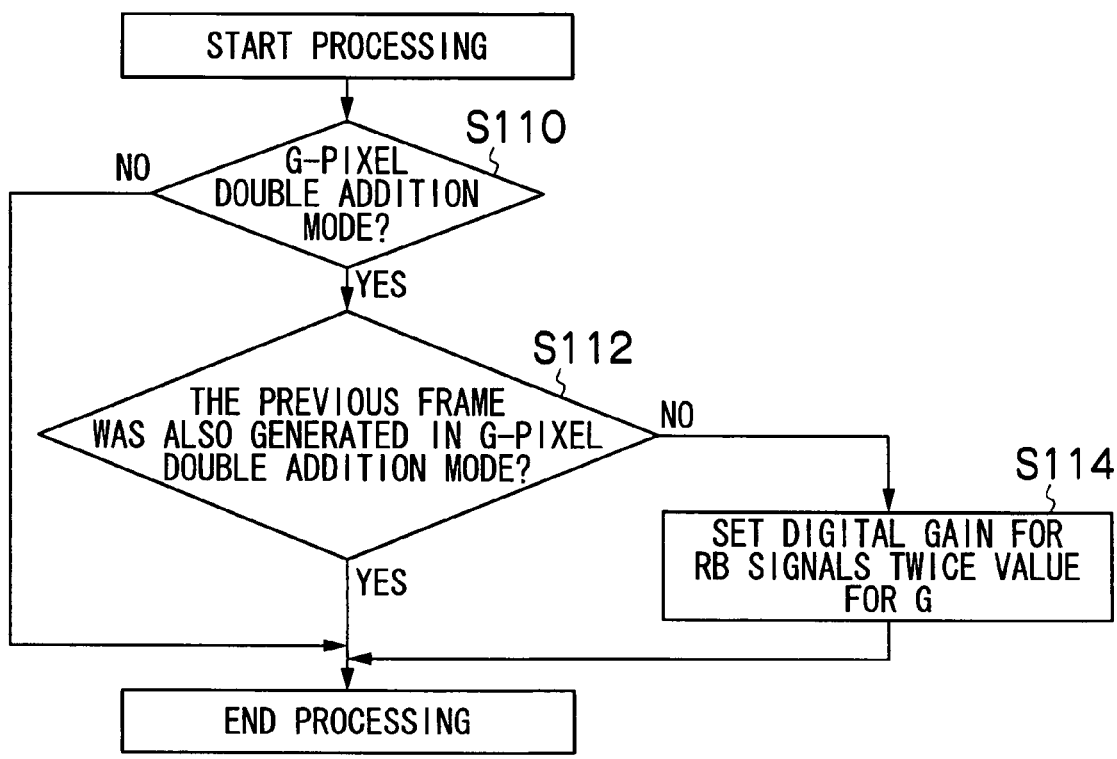
FIG. 14 shows a flowchart illustrating a second embodiment of the image output adjustment method.

FIG. 14 shows a flowchart illustrating a second embodiment of the image output adjustment method. First, while a through-movie picture is displayed on the liquid crystal monitor 26, the CPU 10 determines whether the pixel addition mode is G-pixel double addition mode (step S110). If the pixel addition mode is G-pixel double addition mode (YES at step S110), it is determined whether the pixel addition mode which was set in generating the image of the frame preceding the through-movie picture was also G-pixel double addition mode (step S112). The time at which normal addition mode is switched to G-pixel double addition mode is stored in the memory 20 by the CPU 10, for example. If the pixel addition mode which was set in generating the image of the previous frame was also G-pixel double addition mode (YES at step S112), processing is terminated. On the other hand, if the pixel addition mode which was set in generating the image of the previous frame was not normal addition mode (NO at step S112), digital gain (or white balance gain) which is applied to R and B signals by the image signal processing circuit 56 is changed to twice the white balance gain for G signal (step S114). If the pixel addition mode has been switched from G-pixel double addition mode to normal addition mode, white balance gain applied to R and B signals is changed to about half of that before the switching of the pixel addition mode. This can prevent the color of the through-movie picture from being greenish, which occurs as a result of vertical addition of G signals for a number of pixels twice that for R and B signals.

[Adjustment Method Based on Video Signal Control]

Figure 15:
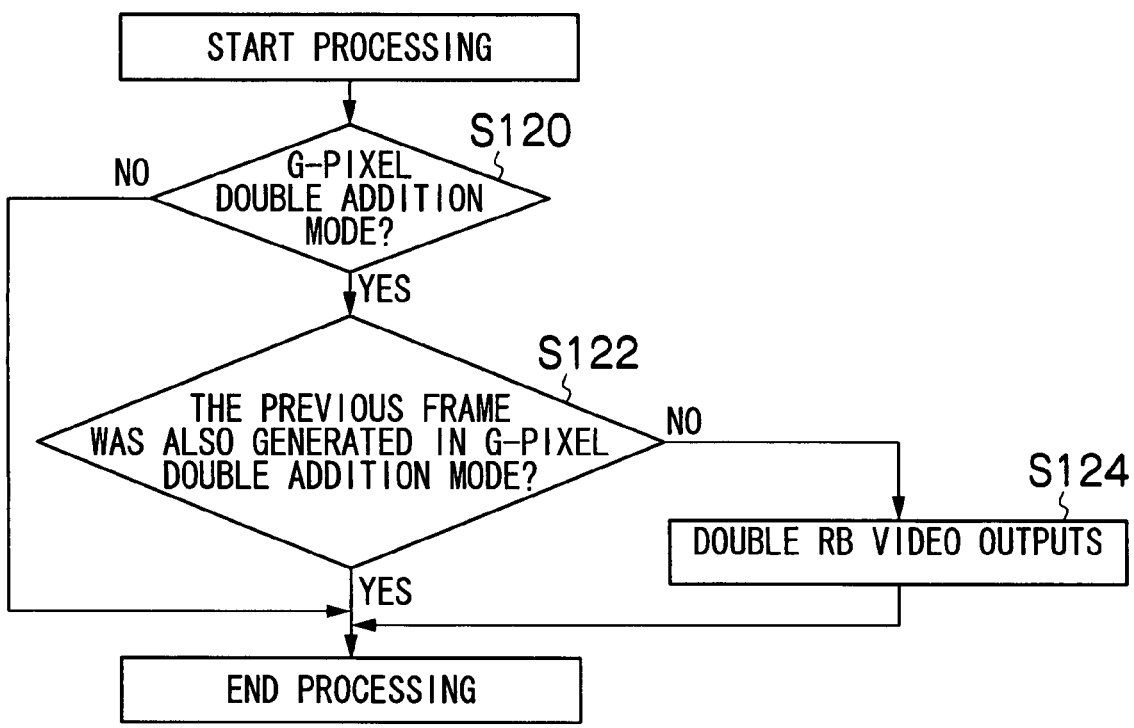
FIG. 15 shows a flowchart illustrating a third embodiment of the image output adjustment method.

FIG. 15 shows a flowchart illustrating a third embodiment of the image output adjustment method. First, while a through-movie picture is displayed on the liquid crystal monitor 26, the CPU 10 determines whether the pixel addition mode is G-pixel double addition mode (step S120). If the pixel addition mode is G-pixel double addition mode (YES at step S120), it is determined whether the pixel addition mode which was set in vertical transfer of pixel signals when generating the image of the frame preceding the through-movie picture was also G-pixel double addition mode (step S122). The time at which normal addition mode is switched to G-pixel double addition mode is stored in the memory 20 by the CPU 10, for example. If the pixel addition mode for generating the image of the previous frame was also G-pixel double addition mode (YES at step S122), processing is terminated. However, if the pixel addition mode for generating the image of the previous frame was not normal addition mode (NO at step S122), video output signals for R and B output from the video encoder 58 are amplified about twofold (step S124). In a case the pixel addition mode has been switched from G-pixel double addition mode to normal addition mode, video output signals for R and B are changed to about half of that prior to the switching of the pixel addition mode. This can prevent the color of the through-movie picture from being greenish, which occurs as a result of vertical addition of G signals for a number of pixels twice that for R and B signals.

While the number of pixels for vertical addition of G signal is twice that for R and B signals in this embodiment, the multiplication factor may be larger than twofold depending on the arrangement of photodiodes on the CCD 36 or the like.

What is claimed is:

1. An imaging apparatus, comprising image pickup elements for obtaining image signals and a control device which control read-out of image signals from the image pickup elements, wherein
    the image pickup elements comprise:
    light receiving elements which separate incident light into R, G and B colors and photoelectrically convert the incident light separated into the individual colors to obtain image signals including R, G and B signals corresponding to each of the colors;
    a vertical transfer channel for vertically transferring an image signal read out from the light receiving elements; and
    a horizontal transfer channel for horizontally transferring the vertically transferred image signal,
    the control device comprises:
    a read-out control device which applies a reading pulse to the light receiving elements to control read-out of the image signal from the light receiving elements;
    a vertical transfer control device which controls vertical transfer of an image signal read out onto the vertical transfer channel;
    a horizontal transfer control device which controls horizontal transfer of an image signal read out onto the horizontal transfer channel; and
    a driving control device which controls the read-out control device and the vertical transfer control device so that the R and B signals are each vertically added for a first number of vertical addition pixels and the G signals are vertically added for a second number of vertical addition pixels that is larger than the first number of vertical addition pixels.

2. The imaging apparatus according to claim 1, wherein the second number of vertical addition pixels is twice the first number of vertical addition pixels.

3. The imaging apparatus according to claim 2, wherein on the light receiving elements, pixels each of which is assigned a color filter of any one of R, G and B colors are two-dimensionally arranged being diagonally displaced with respect to each other at an angle of 45°, the light receiving elements comprising: G1 and G2 lines which are formed only of G pixels in the horizontal direction; an RB line which is formed between the G1 and G2 lines and in which R pixels and B pixels are alternately positioned; and a BR line which is formed between the G2 and G1 lines and in which B pixels and R pixels are alternately positioned, wherein the read-out control device reads out signals discarding only B and R pixels in the BR line between the G2 and G1 lines when G signals read out from the G pixels are vertically added for the number of pixels twice the number of pixels for R and B signals which are read out from the R pixels and the B pixels, respectively.

4. The imaging apparatus according to claim 1, wherein the image pickup elements further comprise a signal retention device which temporarily retains the vertically transferred R, G and B signals, and
    the driving control device sends the vertically transferred R, G and B signals into the signal retention device to vertically add the R, G and B signals.

5. The imaging apparatus according to claim 1, wherein the driving control device controls the horizontal transfer control device to horizontally add the horizontally transferred image signals for a predetermined number of pixels for each color.

6. The imaging apparatus according to claim 1, further comprising a focusing detection device which performs focusing detection based on the vertically added image signals.

7. The imaging apparatus according to claim 1, further comprising an exposure control device which controls exposure based on the vertically added image signals.

8. The imaging apparatus according to claim 1, further comprising a pixel addition mode switching device which switches a pixel addition mode between normal addition mode in which the R, G and B signals are each vertically added for the same number of pixels and G-pixel priority addition mode in which the R and B signals are each vertically added for a first number of vertical addition pixels and the G signals are vertically added for a second number of vertical addition pixels which is larger than the first number of vertical addition pixels.

9. The imaging apparatus according to claim 8, further comprising:
    a determination device which determines if a shooting environment is low light, wherein
    if the determination device determines that the shooting environment is low light, the pixel addition mode switching device switches the pixel addition mode to G-pixel priority addition mode.

10. The imaging apparatus according to claim 8, further comprising:
    a sensitivity setting device which sets ISO sensitivity, wherein
    when the ISO sensitivity is set to a predetermined value or higher, the pixel addition mode switching device switches the pixel addition mode to G-pixel priority addition mode.

11. The imaging apparatus according to claim 1, further comprising: a G-capacity limiting device which limits the saturation capacity of pixels on the light receiving elements in which G signals are accumulated.

12. The imaging apparatus according to claim 1, further comprising: an image signal amplification device which amplifies image signals output from the image pickup elements, the image signal amplification device adjusting analog gain for R and B signals to be equal to analog gain for G signal multiplied by the second number of vertical addition pixels/ the first number of vertical addition pixels while the pixel addition mode is set to G-pixel priority addition mode.

13. The imaging apparatus according to claim 1, further comprising: a white balance adjustment device which adjusts white balance based on the image signals, the white balance adjustment device adjusting white balance gain for R and B signals to be equal to white balance gain for G signal multiplied by > the second number of vertical addition pixels/ the first number of vertical addition pixels while the pixel addition mode is set to G-pixel priority addition mode.

14. The imaging apparatus according to claim 1, further comprising:

an image display device which converts an image signal output from the image pickup elements into a video signal for display thereon; and a video signal amplification device which adjusts video signals for R and B signals to be equal to G signal multiplied by > the second number of vertical addition pixels/ the first number of vertical addition pixels while the pixel addition mode is set to G-pixel priority addition mode.

* * * * *